Figure 1:
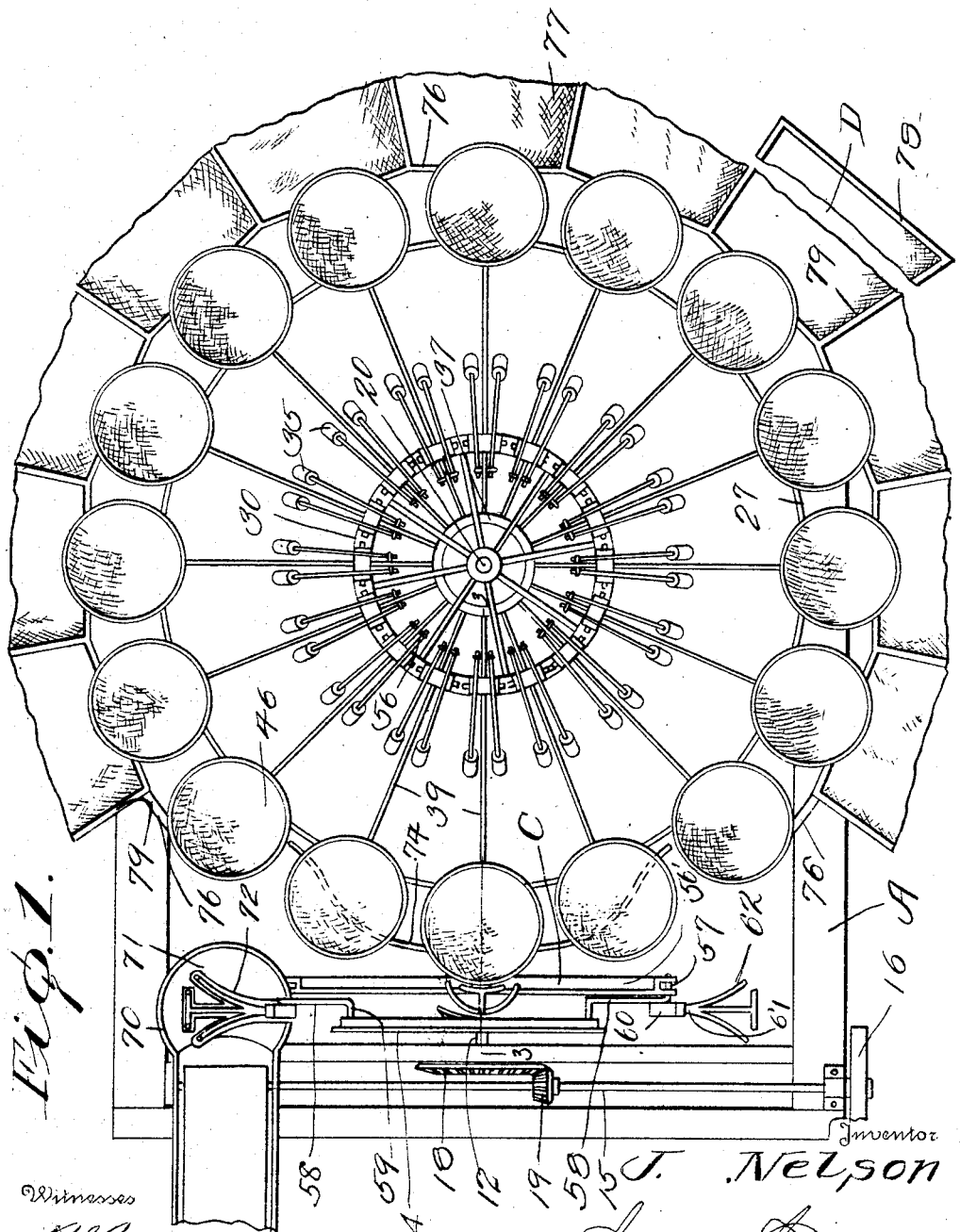

J. NELSON.
FRUIT GRADING MACHINE.
APPLICATION FILED SEPT. 8, 1914.

1,171,746.

Patented Feb. 15, 1916.
4 SHEETS—SHEET 1.

Inventor
J. Nelson

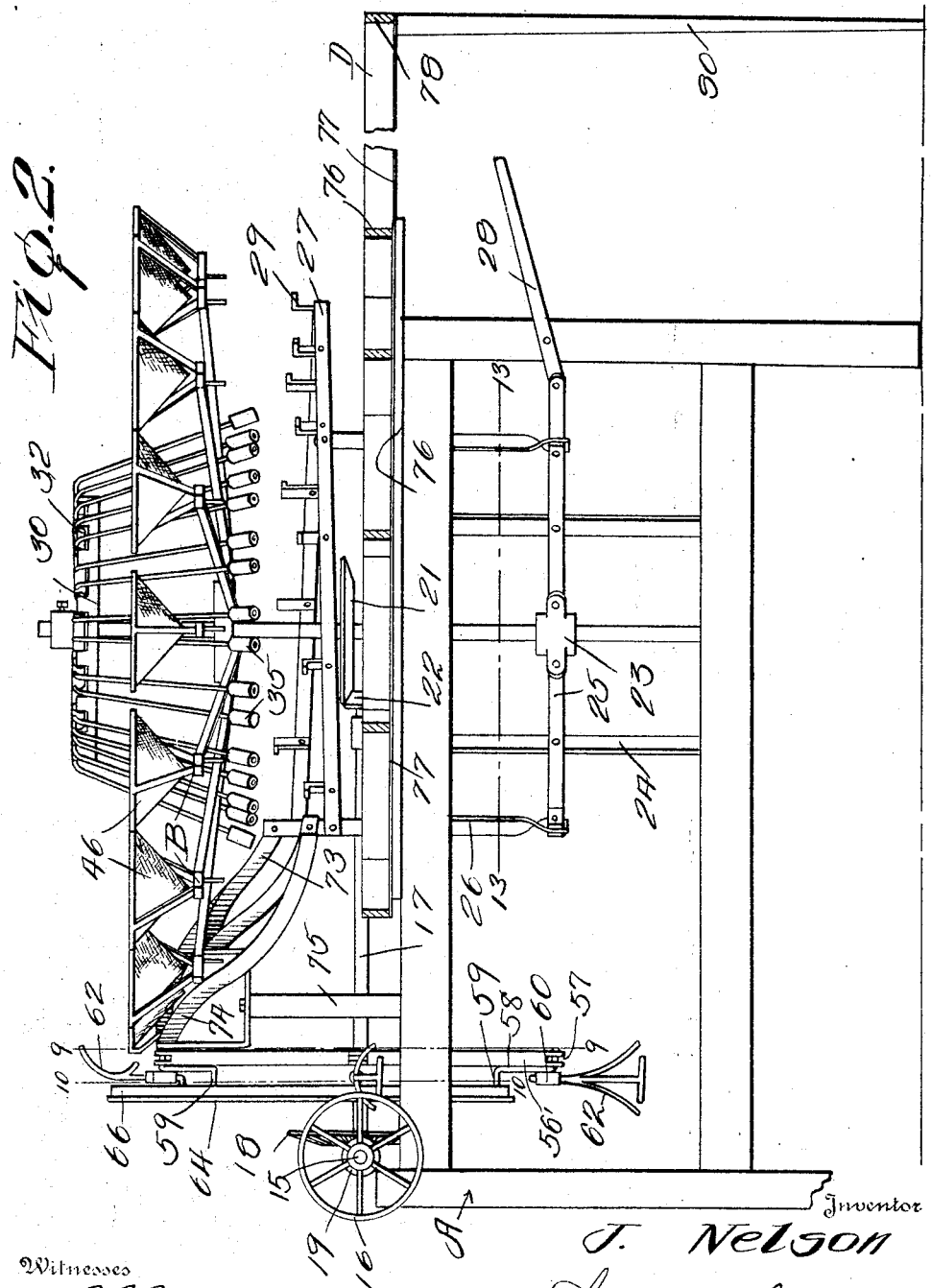

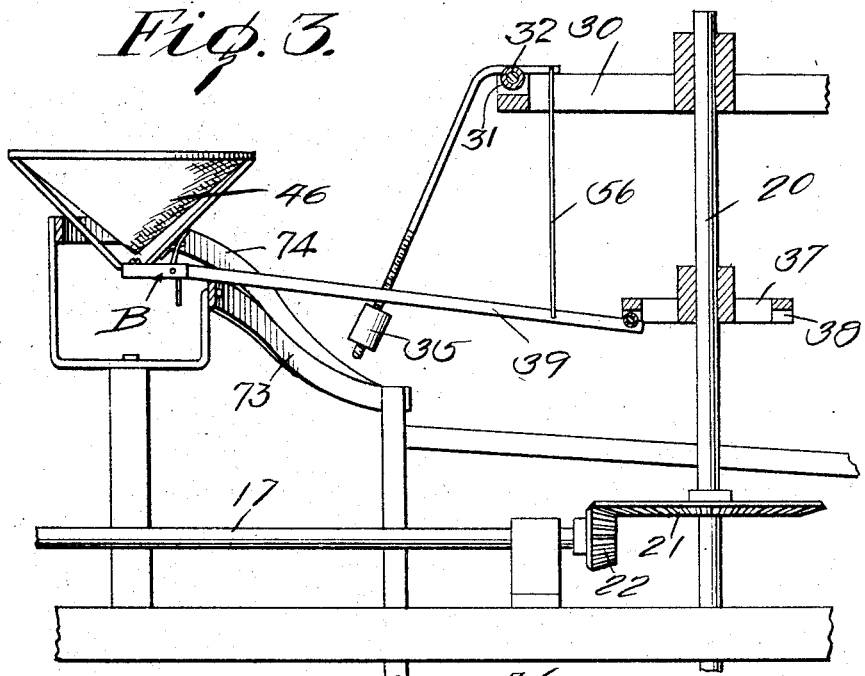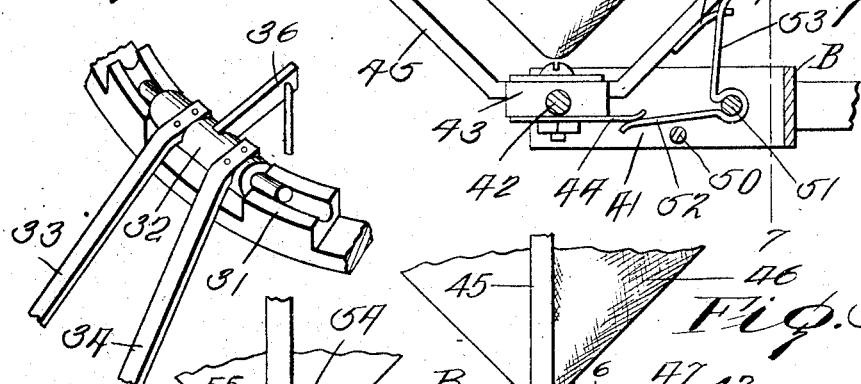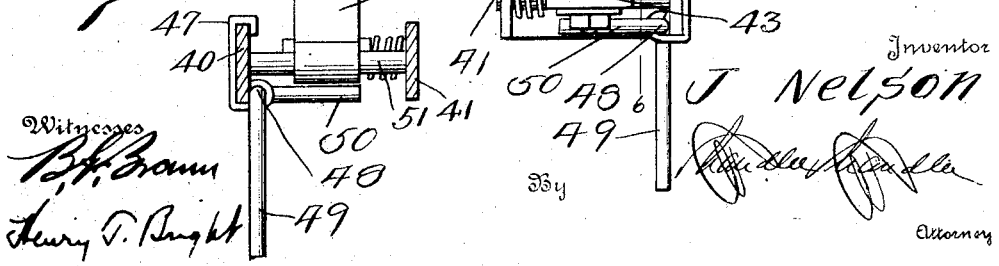

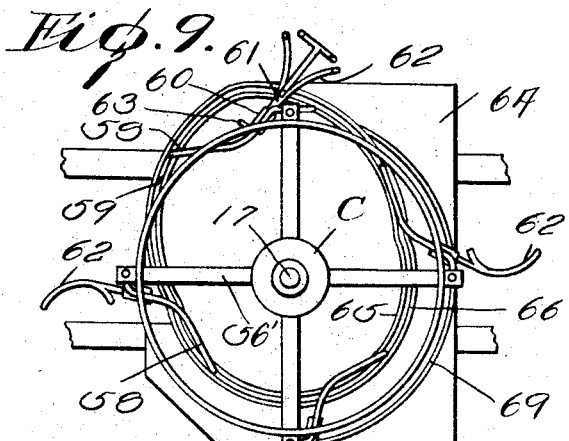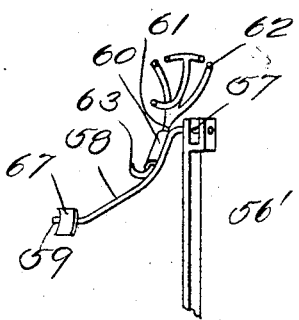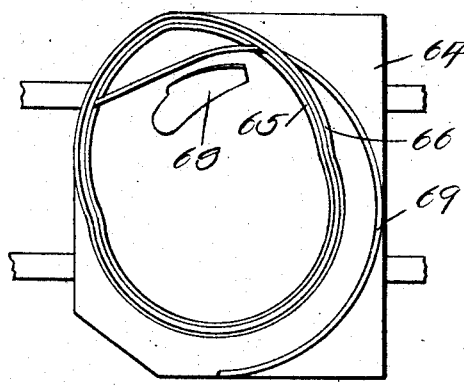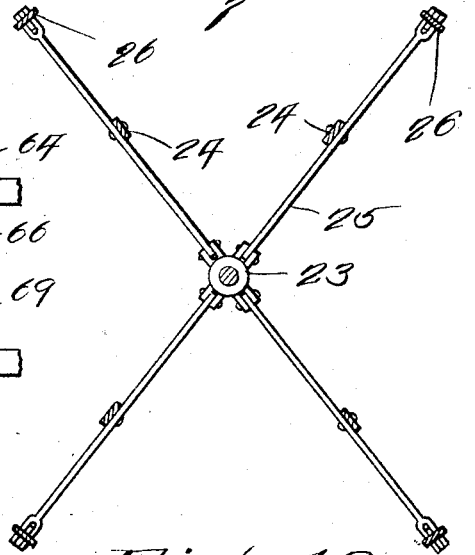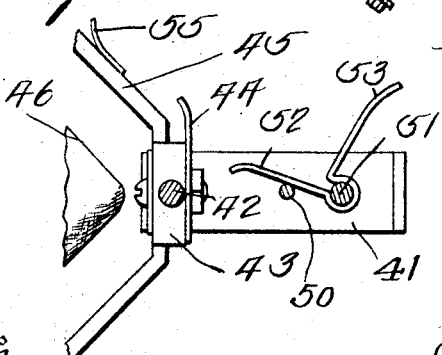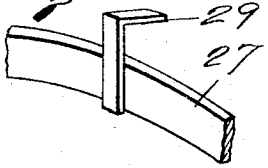

UNITED STATES PATENT OFFICE.

JOHN NELSON, OF SELAH, WASHINGTON.

FRUIT-GRADING MACHINE.

1,171,746.  Specification of Letters Patent.  Patented Feb. 15, 1916.

Application filed September 8, 1914. Serial No. 860,698.

*To all whom it may concern:*

Be it known that I, JOHN NELSON, a citizen of the United States, residing at Selah, in the county of Yakima, State of Washington, have invented certain new and useful Improvements in Fruit-Grading Machines; and I do hereby declare the following to be a full, clear, and exact description of the invention, such as will enable others skilled in the art to which it appertains to make and use the same.

This invention relates to fruit grading machines.

The object of the invention resides in the provision of a fruit grading machine which will automatically remove the fruit one at a time from a suitable supply, discharge same into a moving carrier and the latter being automatically operated to discharge the fruit upon a subdivided sorting table, the discharge of the fruit from the carrier being controlled by the weight thereof.

A further object of the invention is to generally improve machines of this type so as to render them more reliable and efficient and increase the rapidity with which the fruit is graded.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of a fruit grading machine constructed in accordance with the invention with a fragment only of the sorting table shown; Fig. 2, a side elevation of the machine with the sorting table entirely removed; Fig. 3, a section on the line 3—3 of Fig. 1; Fig. 4, a detail perspective view showing the mounting of the weight elements which control respective pivoted carriers; Fig. 5, an enlarged view looking at the outer end of one of the carriers; Fig. 6, a section on the line 6—6 of Fig. 5; Fig. 7, a section on the line 7—7 of Fig. 6; Fig. 8, a view similar to Fig. 6 showing the cup element of the carrier in discharged position; Fig. 9, a section on the line 9—9 of Fig. 2; Fig. 10, a section on the line 10—10 of Fig. 2; Fig. 11, a detail perspective view disclosing the construction and mounting of one of the feeding carriers; Fig. 12, a detail perspective view of one of the tripping devices employed in the machine, and Fig. 13, a section on the line 13—13 of Fig. 2.

Referring to the drawings the invention is shown as comprising a frame A suitably designed to support the various mechanisms of the machine. Rotatably mounted upon the frame A transversely thereof is a drive shaft 15 having fixed thereon a belt wheel 16 for connection with a suitable source of power. Rotatably mounted on the frame A longitudinally of the latter is a shaft 17 which has fixed on its outer end a gear 18 meshing with a gear 19 fixed on the shaft 15. Journaled on the frame A is a vertical shaft 20 which has fixed thereon a gear 21 meshing with a gear 22 fixed on the inner end of the shaft 17.

Slidably mounted on the shaft 20 is a sleeve 23 and mounted in the frame A around the shaft 20 are vertical bars 24 upon which are pivoted respectively levers 25 having corresponding ends pivotally connected to the sleeve 23. The ends of the levers 25 remote from the shaft 20 are pivotally connected to the lower ends of vertical bars 26 respectively slidably mounted in the frame A and carrying at their upper ends a substantially circular track 27 arranged concentric to the shaft 20. Pivoted on the frame A is an operating lever 28 which is suitably connected to the outer end of one f the levers 25. By operating the lever 28 it will be obvious that the levers 25 can be in turn operated for the purpose of raising and lowering the bars 26 and of course the track 27. Mounted upon the track 27 at suitably spaced points is a plurality of tripping devices 29 for a purpose that will presently appear.

Fixed on the upper end of the shaft 20 is a wheel 30 the periphery of which is provided with a plurality of spaced lugs 31. Rotatably mounted between adjacent lugs 31 are rollers 32 which have secured thereto the inner ends of arms 33 and 34 respectively. The outer ends of these arms are bent downwardly and have adjustably mounted thereon respectively weights 35. Formed integral with each roller 32 is an inwardly extending arm 36 the purpose of which will presently appear. Fixed on the shaft 20 beneath the wheel 30 is a smaller wheel 37 the periphery of which is provided on its underside with spaced lugs 38. Pivotally mounted between adjacent lugs 38 are the inner ends of arms 39, the outer ends of which have secured thereto respectively U-shaped members B each including arms 40 and 41. Rotatably mounted between the arms 40 and 41 is a shaft 42 having an enlarged central portion 43 to which is secured a setting toe 44 for a purpose that will presently appear. Suitably secured to the enlarged portion 43 is a frame 45 which supports a funnel shape fruit receiver 46 constructed preferably of canvas or other desirable fabric.

Mounted upon the arm 40 is a bracket 47 in which is rotatably mounted a rod 48 having its terminals bent laterally to form portions 49 and 50 disposed at right angles to each other, the portion 49 projecting downwardly while the portion 50 is disposed substantially in the plane of the member B. The arms 40 and 41 are connected above the rod 48 by means of a bar 51 upon which is rotatably mounted a leaf spring, including arms 52 and 53, the former being disposed above the portion 50 of the rod 48 and having its free end engaged beneath the toe 44, while the latter is provided with an opening 54 in which a catch 55 is adapted to engage to hold the frame 45 in set position, said catch being carried by the frame 45 as will be obvious. The arms 39 correspond in number to the arms 36 and the free end of each arm 36 is connected to the arm 39 disposed therebeneath by means of a cable 56. In this connection it will be noted that the weights 35 tend through the cable 56 to raise the free end of the associated arm 39 and that by employing two weighted arms 33 and 34 disposed on opposite sides of the arm 39 friction resulting from side draft is eliminated.

Mounted in a fixed manner upon the shaft 17 adjacent the outer ends of the arms 39 is a spider wheel C including arms 56'. Rotatably mounted in the free end of each arm 56' is the laterally turned end 57 of an arm 58. The other end of this arm 58 is also laterally turned as at 59 in a direction opposite to the end 57 for a purpose that will presently appear. Mounted on each arm 58 is a bearing 60 in which is rotatably mounted a shaft 61 terminating at one end in a skeleton frame-like portion 62, said portion being suitably dished to receive a single fruit. The end of the shaft 61 remote from the frame-like portion 62 terminates in a toe 63 for a purpose that will presently appear. Mounted on the frame A between the spider wheel C and the gear 18 is a plate 64 having formed or otherwise suitably provided on its inner face substantially oval shaped spaced ribs 65 and 66 between which travel guides 67 rotatably mounted on the ends 59 respectively of the arms 58. The plate 64 is further provided on its inner face with a cam projection 68 adapted to engage successively the toes 63 on the shaft 61 to rotate said shaft and dispose the frame 62 in position to discharge the fruit carried thereby into the cup 46 positioned to receive it. The plate 64 is further provided on its inner face with a rib 69 adapted to be successively engaged by the toes 63 to rotate the shaft 61 so as to dispose the frame 62 in position to pick up a single fruit from a hopper 70 mounted upon the frame A and through which latter the frame 62 on the end of each shaft 61 passes during the rotation of the wheel C. This hopper 70 is preferably constructed of a suitable frame supporting a canvas wall 71 and provided with a suitable opening 72 in its bottom to permit the passage of the frames 62 during the rotation of the wheel C. The track 27 as it approaches the wheel C from either direction rises as at 73 and in addition is forked or divided to form an additional track 74, the ascending portions of the track 27 and also the track 74 are supported by a standard 75 suitably mounted upon the frame A.

Mounted upon the frame A and surrounding the track 27 is a ring or hoop 76 to which is attached the canvas bottom 77 of a sorting table D. This sorting table further comprises a frame portion including an outer ledge 78 and radial division members 79 dividing the table into compartments. The outer end of the table is supported upon suitable legs 80, the inner ends of the division members 79 being suitably secured to the hoop 76. It will be noted that the tripping devices 29 are disposed substantially midway between adjacent division members 79, and it will be further noted that these tripping devices are disposed in the path of the portions 49 of the rods 48 during the rotation of the shaft 20. It will be noted that by raising and lowering the track 27 through the medium of the lever 28 the tripping devices 29 can be adjusted vertically to a desired elevation according to the particular character of the fruit being graded.

In order to effect the operation of the machine it is only necessary to rotate the shaft 15 and maintain a supply of fruit in the hopper 70. During the rotation of the shaft 15 it will be obvious that the arms 39 and cups 40 together with the spider wheel C will be simultaneously rotated. During the rotation of the wheel C the frames 62 will each pick up a single fruit. As each frame approaches its uppermost position the toe 63 on the shaft 61 will engage the cam element 68 when further rotation of the wheel C will rotate the shaft 61 so as to discharge the fruit carried by the frame into the cup 46 positioned to receive it. Further rotation of the wheel C will disengage the toe 63 from the cam element 68 and said toe will then pass into engagement with the rib 69 so as to rotate the shaft 61 in the opposite direction and position the frame 62 properly for passage through the hopper 70 to pick up another fruit.

When a fruit has been delivered into one of the cups 46 and the arm 39 associated with said cup continues its movement under the influence of the rotation of the shaft 20 the weight of the fruit will cause the cup and the outer end of the arm 39 to move downwardly against the influence of the weights 35. The extent of the downward movement of the cup 46 and the free end of the arm 39 will of course be dependent upon the weight of the particular fruit. It will be noted that the tripping devices 29 successively increase in height in the direction of rotation of the shaft 20. As a result of this structure it will be obvious that the portion 49 of the rod 48 associated with the arm 39 the free end of which is depressed by the heaviest fruit will be first to engage a tripping device with the result that the portion 50 of the rod 48 will move upwardly and engage the arm 52 of the locking spring and rotate the latter to disengage the arm 53 thereof from the catch 55. Further movement of the arm 52 under the influence of the portion 50 will engage the former with the toe 54 and raise the frame 45 and cup 46 into position to discharge the fruit carried by the cup into a predetermined compartment of the sorting table. Continued movement of the arm 39 carrying the cup from which the fruit has been discharged will bring said arm into engagement with the rising portion 73 of the track 27 and the frame 45 into engagement with the track 74 and these track portions will operate to reset the frame 45 and cup 46 and restore the arm 39 to its original position. This operation is continued until the desired quantity of fruit has been graded.

What is claimed is:—

An assorting device comprising a rotatable vertical shaft, wheels fixed on said shaft at spaced points, arms pivoted on the upper wheel, weights adjustably mounted on said arms adjacent their outer ends, a plurality of arms pivoted on the lower wheel, links connecting the inner ends of corresponding arms on the upper and lower wheels, an article carrier pivoted on the outer end of each arm mounted on the lower wheel, means for locking the carriers against pivotal movement, and trips for releasing said locking means, said trips being disposed at different elevations.

2. In an assorting apparatus, the combination of a series of rotating distributing arms having a yielding movement in a plane parallel to their axis of rotation, the extent of said movement being governed by the weight of the article, tilting cups mounted on the arms to carry the article, a latch mounted on the outer end of each arm including diverging portions engaging the cup at different points, one of said portions being provided with an opening, a finger on the cup engageable through said opening to lock the cup against tilting movement, and trips disposed at different elevations for operating said latch device to disengage the finger from said opening and permit tilting movement of the cup.

3. An assorting apparatus comprising a series of rotating distributing arms, article supporting means carried by each arm, means for feeding articles singly to the supporting means, said means comprising a hopper, a rotatable wheel, a plurality of carriers each rotatably mounted on the wheel and movable bodily through the hopper during the rotation of the wheel to gather an article, means for independently rotating said carriers at a predetermined time during rotation of the wheel to discharge the article therein into the coöperating article supporting means, and means for subsequently rotating the carrier to properly position same for passage through the hopper.

In testimony whereof I affix my signature, in the presence of two witnesses.

JOHN NELSON.

Witnesses:
L. L. BOLLES,
W. H. SCOTT.